US006256485B1

(12) United States Patent
Heard

(10) Patent No.: US 6,256,485 B1
(45) Date of Patent: Jul. 3, 2001

(54) WIDEBAND RADIO RECEIVER

(75) Inventor: William L. Heard, Richardson, TX (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 06/454,419

(22) Filed: Dec. 29, 1982

(51) Int. Cl.[7] .................................................... H04B 1/18
(52) U.S. Cl. ..................................... 455/161.1; 455/196.1
(58) Field of Search .............................. 455/146, 161.1, 455/196.1; 343/5 SA, 5 FT, 17.2 PC; 324/77 C, 77 CS

(56) References Cited

U.S. PATENT DOCUMENTS 2,954,465 * 9/1960 White ................................... 455/146

3,745,571 * 7/1973 Chwastyk et al. ............ 343/17.2 PC

* cited by examiner

Primary Examiner—Theodore M. Blum
(74) Attorney, Agent, or Firm—Baker Botts L.L.P.

(57) ABSTRACT

A wideband radio receiver utilizes a plurality of frequency domain samplers to process an input signal. Each of the frequency domain samplers includes a sweep frequency oscillator and a mixer for combining the input signal with the sweep signal. The output of the mixer is passed through a frequency weighting filter to a dispersive delay line. The output of the dispersive delay line is digitized to produce I and Q channel digital outputs. Digital outputs from each of the frequency domain samplers are compensated for time and amplitude and then stored in a random access memory. A signal detection processor examines the outputs of the frequency domain samplers to detect the presence of a signal within the input signal. When a particular signal is detected, a data access circuit is commanded to read the stored digital outputs which correspond to the intercept bandwidth cell for the detected signal. The data thus read from the random access memory comprises the digital I and Q outputs of the wideband radio receiver.

5 Claims, 6 Drawing Sheets

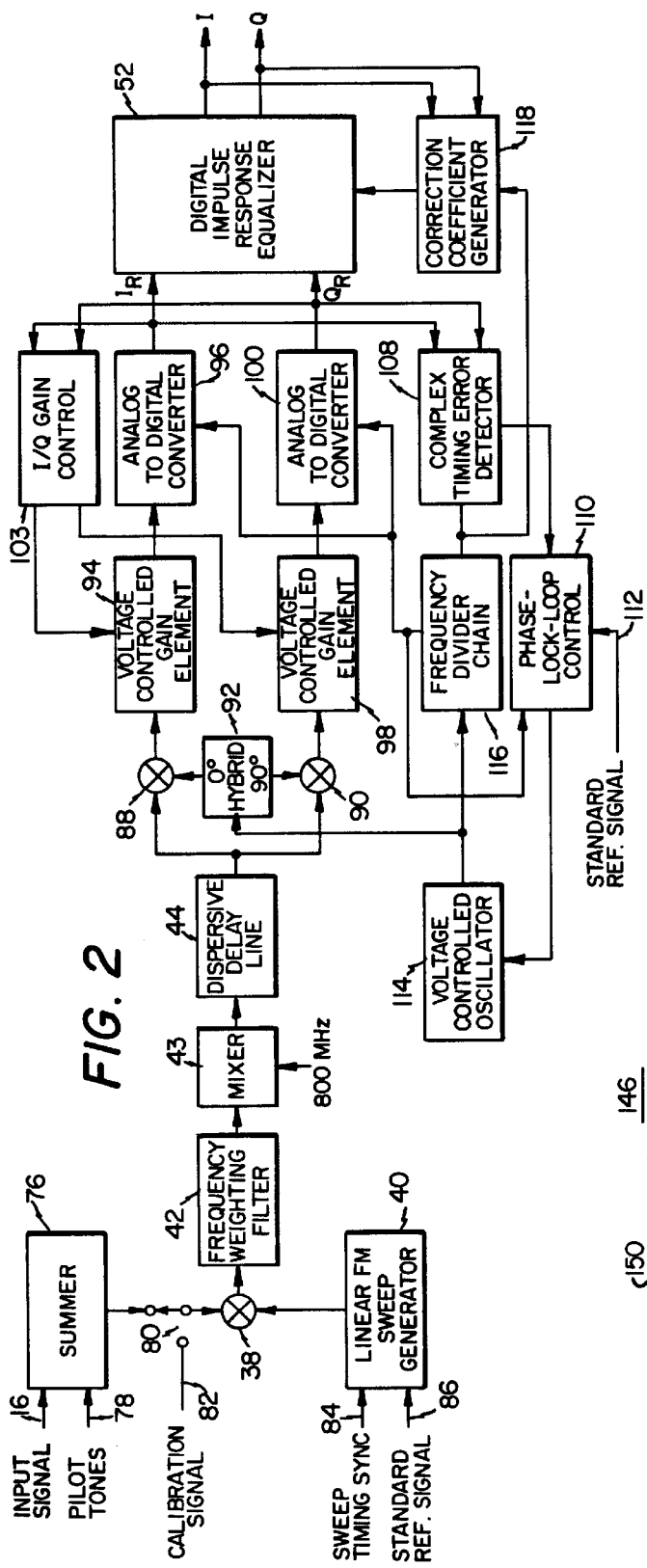
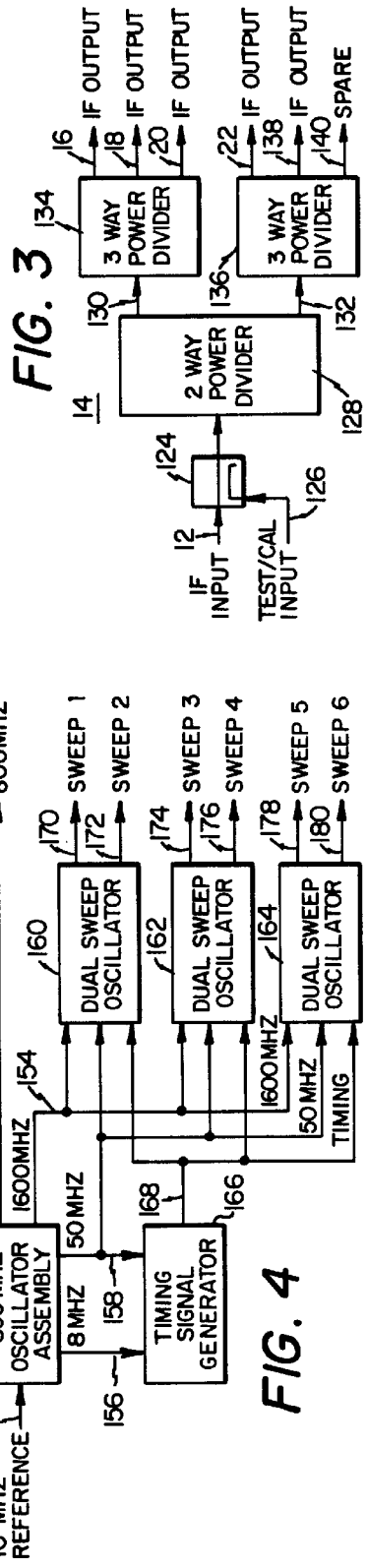

WIDEBAND RADIO RECEIVER

TECHNICAL FIELD

The present invention pertains in general to radio receivers and in particular to a wideband, multichannel receiver which produces a digital output.

BACKGROUND ART

There are numerous requirements for a radio receiver which can cover an extremely wide frequency band while guaranteeing a high probability of intercept for any signal within this band. This is particularly true with regard to electronic warfare receivers which are used to receive a signal that does not have a previously known carrier frequency.

Receiver systems have been developed which utilize a sweeping local oscillator signal to provide a greater reception bandwidth. Such receivers are shown in U.S. Pat. No. 4,204,165 to Ready and in U.S. Pat. No. 2,954,465 to White. It has been found, however, that there are substantial practical limitations to the intercept bandwidth of such systems. The maximum bandwidths are typically limited by a specific circuit common to the entire receiver. This can take the form of a maximum rate for a digital sampler or the maximum possible IF bandwidth. Due to these restrictions there is a limit to the maximum bandwidth which can be received by such receivers while guaranteeing a very high probability of intercept.

In view of the need for a receiver system having an extremely wide intercept bandwidth, there exists a requirement for a receiver which can be incrementally expanded channel by channel to proportionately widen the intercept bandwidth while the system is not limited to the maximum performance for a single circuit or component.

SUMMARY OF THE INVENTION

A preferred embodiment of the present invention comprises a wideband radio receiver which includes a signal distribution circuit for receiving an input signal and providing the input signal to a plurality of output terminals. The receiver further includes a system timing circuit and a plurality of frequency domain samplers which are connected respectively to the distribution circuit output terminals for receiving the input signal. Each of the frequency domain samplers includes a sweep oscillator for generating a repetitive sweep signal which is triggered by the system timing circuit. The sweep oscillators in the receiver are triggered sequentially by the system timing circuit. Each frequency domain sampler also includes a mixer connected to receive the input signal and the sweep signal for the corresponding frequency domain sampler, a frequency weighting filter connected to receive the output of the mixer, a dispersive delay line connected to receive the output of the frequency weighting filter and a digitizing circuit operating in response to the system timing circuit for digitizing the output of the dispersive delay line to produce a digital channel output. The radio receiver includes a circuit for storing for a limited time the digital channel outputs from the frequency domain samplers. Additional circuitry is provided to read selected ones of the stored digital channel outputs to produce a digital output signal for the radio receiver.

BRIEF DESCRIPTION OF THE DRAWINGS

For a more complete understanding of the present invention and the advantages thereof, reference is now made to the following Description taken in conjunction with the accompanying Drawings in which:

FIG. 2 is a detailed block diagram of a frequency domain sampler shown in FIG. 1, FIG. 3 is a block diagram of the signal distribution circuit shown in FIG. 1, FIG. 4 is a block diagram of an oscillator assembly which is utilized in the circuit of FIG. 1 for producing the sweep oscillator signals utilized in each of the frequency domain samplers.

DETAILED DESCRIPTION

Figure 1:
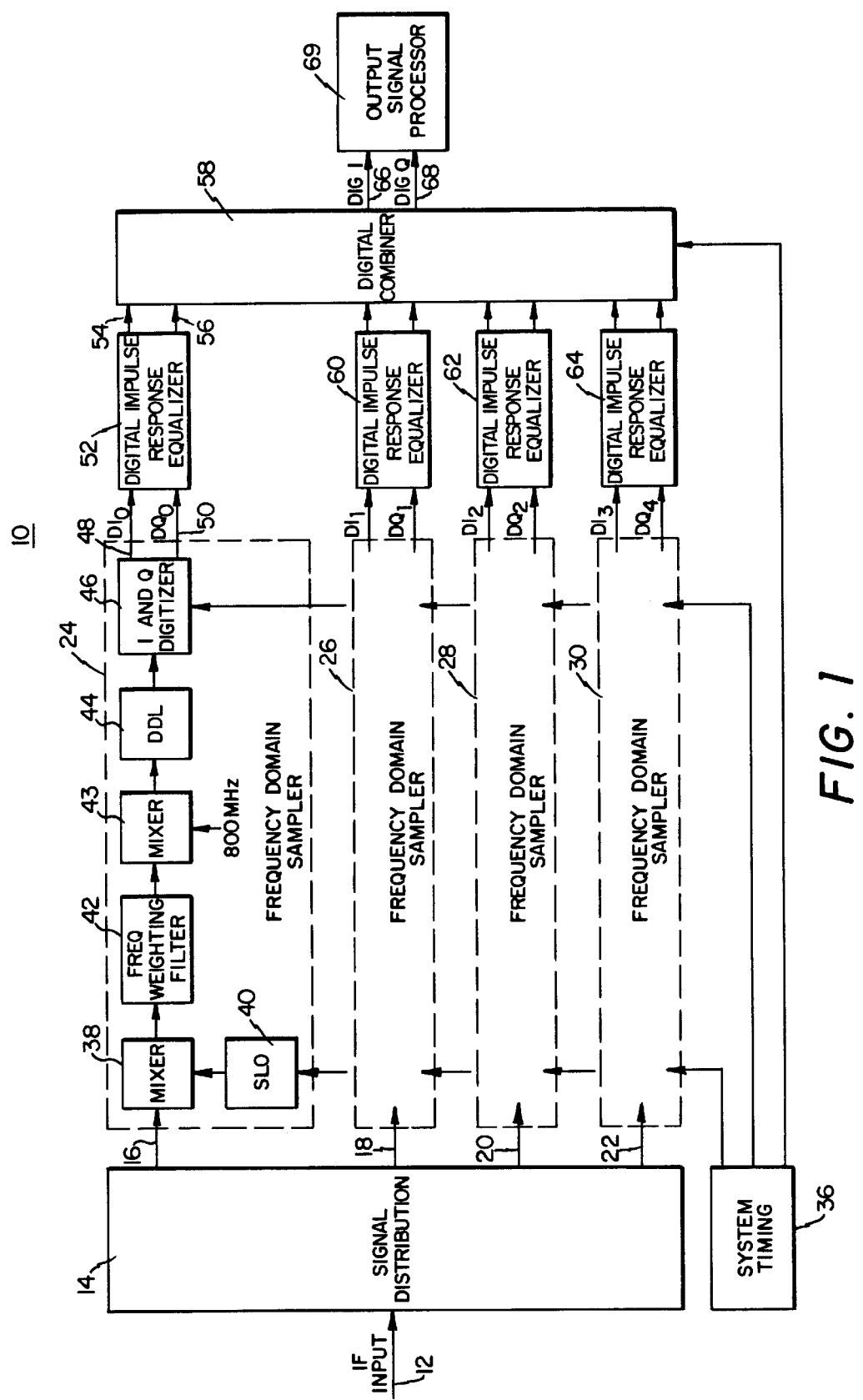
FIG. 1 is a functional block diagram illustrating a wideband radio receiver in accordance with the present invention.

A wideband radio receiver which incorporates the present invention is illustrated as a functional block diagram in FIG. 1. This receiver is designated generally by the reference numeral 10. The receiver 10 receives an IF input signal through a line 12 to a signal distribution circuit 14. The circuit 14 has a plurality of output terminals 16–22 each of which transmits the IF input signal therethrough. The illustrated receiver 10 has four channels, however, the number of channels is dependent upon the spectrum width required for intercept coverage by the receiver 10. A greater number of channels provides a proportionately greater intercept bandwidth.

In the receiver 10, each of the channels includes a respective frequency domain sampler which are noted as 24–30. The output terminals 16–22 are connected respectively to supply the IF input signal to the frequency domain samplers 24–30.

A system timing circuit 36 produces a plurality of timing signals that are supplied to the frequency domain samplers 24–30 and all other receiver elements.

The frequency domain sampler 24 is illustrated as a block diagram and is representative of the remaining frequency domain samplers in the receiver 10. The IF input signal transmitted through terminal 16 is provided as a first input to a mixer 38. A sweep local oscillator (SLO) 40 receives a timing command from the system timing circuit 36 and generates a frequency sweep signal that is provided as a second input to the mixer 38. The output of the mixer 38 is transmitted through a frequency weighting filter 42 to a mixer 43 which also receives an 800 MHZ input signal. The filter 42 is, for example, a ten pole equiripple phase response filter.

The output of mixer 43 is provided to a dispersive delay line 44. In a selected embodiment of the present invention, the dispersive delay line 44 is an Andersen model DS-250-

256 having a 250 MHZ center frequency, an 80 MHZ bandwidth, a 3.2 microsecond maximum differential delay, a −25 MHZ/microsecond frequency slope and a 45 dB insertion loss. The output from the dispersive delay line 44 is a compressed signal which is input to an I and Q digitizer 46. The digitizer 46 produces digital I and Q channel signal samples which are transmitted respectively through lines 48 and 50 to a digital impulse response equalizer circuit 52. The circuit 52 provides compensated digital I and Q channel signal samples through lines 54 and 56 to a digital combiner circuit 58. The system timing circuit 36 also provides timing signals to the combiner circuit 58.

The remaining frequency domain samplers 26, 28 and 30 likewise produce digital I and Q channel signals which are passed respectively through time and amplitude compensation circuits 60, 62 and 64 to the digital combiner circuit 58.

The digital combiner circuit 58 combines the outputs of the multiple digital channel output signals and transmits this single output signal through lines 66 and 68 to an output signal processor 69.

The receiver 10 functions to produce a frequency domain representation of the input signal. The frequency domain samplers each sweep the entire intercept band for the receiver 10. However, each of the sweep signals, such as produced by the sweep local oscillator 40, is time offset. Thus, an input signal present at a given frequency within the intercept bandwidth is mixed at the same time in each of the four channels at different frequencies for the sweep signals. The sweep local oscillator signals are combined in the mixer 38 with the input signal to produce a sum or difference signal which is transmitted to the frequency weighting filter 42. The filter 42 serves to limit the bandwidth of the IF signal in the frequency domain samplers. The output of the filter 42 is combined with the 800 MHZ signal in mixer 43 and the output is provided to a dispersive delay line 44 which has a dispersion characteristic that is matched to the sweep of the local oscillator 40. The output of the dispersive delay line 44 is input to the digitizer 46 which produces orthogonal I and Q components in digital form. These digital components are labeled $DI_O$ and $DQ_O$. These digital channel signals are transmitted through the equalizer circuit 52 to adjust response differences between channels. The digital channel signals from each of the channels are input to the digital combiner circuit 58 where the signals are stored for a limited time and selected stored samples are read to produce a single digital output, comprising both I and Q channels, from the receiver 10.

The use of the multiple channels in the receiver 10 permits a sufficient number of samples to be taken for the intercept bandwidth of the receiver 10 such that the Nyquist criteria is met, that is, at least two samples for each cycle of bandwidth. Thus, there is a guaranteed 100% chance of intercept for any signal in the IF input of the receiver 10. The utilization of a plurality of sampling circuits makes possible the use of an analog-to-digital converter which operates at a reliable and realizable rate. Additional channels can be added to increase the sampling rate proportionate to the desired bandwidth for the input signal to the receiver 10. Each of the digital samples is collected in such a manner that the frequency for the sample is maintained. The frequency of a sample is a function of the frequency domain sampler in which it was taken and time of taking the sample during the frequency sweep. Thus, each sample indicates the amplitude for a particular intercept frequency within the bandwidth of the input signal. Therefor, the receiver 10 produces the equivalent of a frequency domain transform for the IF input signal.

In a numerical example of the present invention the IF input signal at line 12 has a 700 MHZ center frequency and a 25 MHZ bandwidth, the sweep signal produced by oscillator 40 ranges from 1700–1800 MHZ such that the output of mixer 38 is centered at 1050 MHZ. The mixer 43 downconverts the 1050 MHZ signal to 250 MHZ which is the center frequency of the dispersive delay line 44. Within the digitizer 46 the input signal is mixed with a local oscillator 250 MHZ signal to produce a baseband signal that is sampled to generate the I and Q channel signals.

A detailed block diagram of the frequency domain sampler 24 together with the digital impulse response equalizer circuit 52 are shown in FIG. 2. The input signal is transmitted through terminal 16 to a summer 76. A pilot tone is transmitted through a line 78 also to the summer 76. A switch 80 provides either the output of the summer 76 or a calibration signal input through a line 82 to the mixer 38.

As noted above, the sweep generator 40 provides a frequency sweep signal to the second input of the mixer 38. A sweep timing synchronization signal is provided through a line 84 and a standard reference signal is provided through a line 86 to the sweep generator 40. The signals at lines 84 and 86 are derived from the system timing circuit 36.

The output of the mixer 38 is transmitted through the frequency weighting filter 42, the mixer 43 and the dispersive delay line 44 to the inputs of mixers 88 and 90. The mixers 88 and 90 correspond respectively to the I and Q channels which are produced from the signal derived from the dispersive delay line 44. The mixers 88 and 90 receive 90° phase offset 250 MHZ local oscillator signals from a hybrid 92.

The I-channel output from the mixer 88 is transmitted through a voltage controlled gain element 94 to an analog-to-digital converter 96. The Q-channel output from mixer 90 is transmitted through a voltage controlled gain element 98 to an analog-to-digital converter 100. The elements 94 and 98 are controlled in gain in response to digital samples of the pilot tone produced by the I and Q digitizers to equalize the gains of the digitizing channels. The converters 96 and 100 are, for example, TRW model TDC1025EIC units which produce an eight bit flash A/D conversion.

The outputs of the converters 96 and 100 are provided to the digital impulse response equalizer 52 which is described in greater detail below.

An I/Q gain control 103 receives the outputs of the converters 96 and 100. The gain control 103 monitors the amplitudes of the digital samples and produces gain control signals which are transmitted to the gain elements 94 and 98 to equalize the I and Q amplitude responses.

The timing of the taking of the samples by the converters 96 and 100 is controlled by the operation of a phase locked loop. The outputs of the converters 96 and 100 are provided to a complex timing error detector 108 which produces an error signal that is provided to a phase-lock-loop control 110 which receives a standard reference signal through a line 112. The reference signal at line 112 is derived from system timing circuit 36. The control 110 produces a control signal which is input to a voltage controlled oscillator 114. The oscillator 114 produces an output signal which is input to the hybrid 92 to produce the phase offset frequency translation signals that are input to the mixers 88 and 90. The output of the voltage controlled oscillator 114 is also input to a frequency divider chain 116. The chain 116 produces subdivided frequency signals which are input to the complex timing error detector 108, the converters 96 and 100, a correction coefficient generator 118 and the phase-lock-loop control 112.

The I and Q output signals from the equalizer 52 are also input to the correction coefficient generator 118. The coefficients produced by generator 118 are input to the digital impulse response equalizer 52.

The phase control feedback loop comprises the complex timing error detector 108, the phase-lock-loop control 110, the voltage controlled oscillator 114 and the frequency divider chain 116. This feedback loop circuit provides the timing to synchronize the sampling of the received signal in a manner such that each sample can be related to a specific frequency component of the input signal.

The output represented by an I/Q sample pair from equalizer 52 can be shown to be a sample of the frequency function of the input convolved with the time impulse response of the frequency domain sampling channel. This is the basis for compensation of the time response differences between the multiple sampler channels. Using a constant amplitude, constant frequency pilot tone at line 78 as a reference, the phase-locked-loop comprising elements 108, 110, 114 and 116 adjusts the timing of the sampling pulse and the phase of the I/Q demodulating signal in a manner that results in a maximum average sample value for the I sample and a zero mean value for the Q sample at the sample number after the start of the sweep that corresponds to the pilot tone frequency. There are a fixed number of samples per sweep.

The parameters of the selected embodiment result in an input frequency sampling resolution of 500 KHZ centered at 700 MHZ. The frequency sampling region of the input spectrum comprises the frequencies 687.5 MHZ through 712.5 MHZ, or sample numbers 75 through 125 after the start of the sweep. The pilot tone is located at sample number 60 or at a frequency of 685.0 MHZ. The complex timing error detector selects samples 55 through 65 from the I digitizer to develop a coarse error voltage determined by the sum of the magnitudes of samples 55 through 59 minus the sum of the magnitudes of samples 61 through 65. This partial error applied to the 250 MHZ VCO causes the 50th sample to be positioned approximately at the 675 MHZ spectral line. Fine adjustment of the sampling position is accomplished by using the integral of the Q value for the 60th sample applied in a manner to cause its mean to approach zero while at the same time the I value of the 60th sample is positive. This portion of the phase-locked-loop is a second order loop and will remove any group delay errors of the sampling channel caused by component differences. However, noise modulation of the VCO during the sweep can cause phase sampling errors. These are minimized by employing the rate of change of phase between the locally generated 50 MHZ sampling pulse and the 50 MHZ standard reference signal at line 112 to achieve short term frequency stability of the VCO frequency equivalent to that of the system reference.

The timing error correction described above compensates for any differences in group delay between the multiple frequency domain sampler channels.

Referring now to FIG. 3 there is illustrated the signal distribution circuit 14 shown in FIG. 1. The IF input signal is transmitted through line 12 to a pick-up circuit 124. A test/calibration input signal is transmitted through a line 126 to the circuit 124 to provide for testing and calibration of the radio receiver 10. The output of circuit 124 is provided to a two-way power divider 128 which provides the IF signal to lines 130 and 132. Line 130 serves as the input to a three-way power divider 134 which produces the IF signal at terminals 16, 18 and 20. Line 132 provides the input to a three-way power divider 136 which provides the IF signal to the line 22 as well as additional IF output terminals 138 and 140. The power dividers 128, 134 and 136 are well known circuits in the art.

Referring now to FIG. 4 there is illustrated an oscillator assembly 146 which is utilized for producing the sweep local oscillator signals and a frequency translation signal for the frequency domain samplers shown for the radio receiver 10 in FIG. 1. A 10 MHZ reference signal is transmitted through a line 148 to an 800 MHZ oscillator assembly 150, which is described in detail below. The assembly 150 produces an 800 MHZ signal at a line 152 and a 1600 MHZ signal at a line 154. The assembly further produces an 8 MHZ signal at a line 156 and a 50 MHZ signal at a line 158.

Lines 154 and 158 are input to each of three dual sweep oscillators 160, 162 and 164, which are described below in further detail.

The lines 156 and 158 are input to a timing signal generator 166, which is also further described below. The generator 166 produces timing signals which are transmitted through a line 168 to each of the dual sweep oscillators 160, 162 and 164.

The oscillator 160 produces sweep signals labeled sweep 1 and sweep 2 on lines 170 and 172. A respective one of the sweep signals is utilized by each of the frequency domain samplers shown in FIG. 1. The oscillator 162 produces sweep signals 3 and 4 on lines 174 and 176. The oscillator 164 produces sweep signals 5 and 6 on lines 178 and 180. Not all of these sweep signals are utilized in the embodiment of the present invention. However, the number of sweep signals required is dependent upon the intercept bandwidth. Therefore, a greater number of sweep signals may be required than are shown for the present embodiment for a system having a greater intercept bandwidth.

Figure 5:
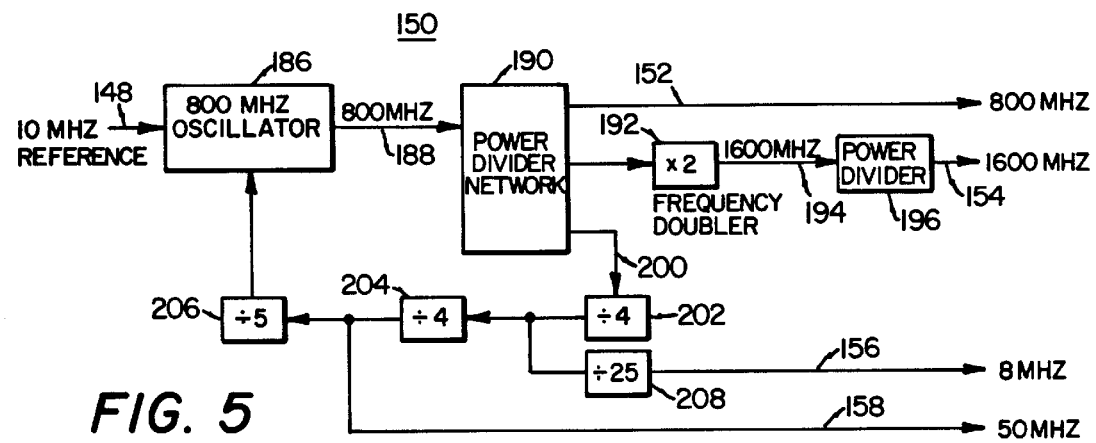
FIG. 5 is a block diagram illustrating an oscillator assembly which is utilized in the circuit of FIG. 4.

The 800 MHZ oscillator assembly 150 shown in FIG. 4 is illustrated in further detail in FIG. 5. The 10 MHZ reference signal is transmitted through line 148 to a phase locked oscillator 186. The oscillator 186 produces an 800 MHZ signal which is transmitted through a line 188 to a power divider network 190. From network 190 the 800 MHZ signal is transmitted to multiple lines 152 and is provided to a frequency doubler 192 to produce a 1600 MHZ signal at a line 194. Line 194 provides an input to a power divider 196 which provides the 1600 MHZ signal at multiple lines 154. The power divider network 190 further transmits the 800 MHZ signal through a line 200 and sequentially through a divide-by-four circuit 202, a divide-by-four circuit 204 and a divide-by-five circuit 206 to provide a second input to the phase locked oscillator 186 for comparison with the 10 MHZ reference at line 148. The output of the divide-by-four circuit 202 is passed through a divide-by-twenty-five circuit 208 to produce the 8 MHZ reference signal at line 156. The output of the divide-by-four circuit 204 is transmitted through line 158 to produce the 50 MHZ reference signal. Each of the signals 800 MHZ, 1600 MHZ, 8 MHZ and 50 MHZ is coherent with the 10 MHZ reference at line 148.

Figure 6:
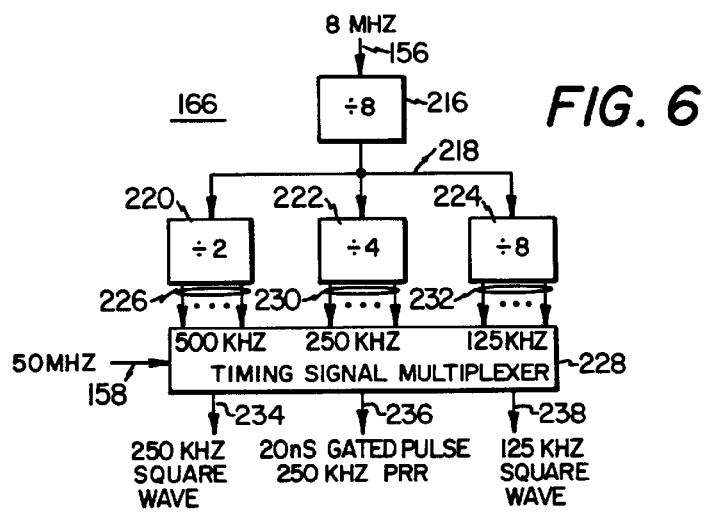
FIG. 6 is a timing signal generator which comprises a portion of the system timing circuit in FIG. 1.

The timing signal generator 166 shown in FIG. 4 is illustrated in greater detail in FIG. 6. The 8 MHZ reference signal on line 156 is input to a divide-by-eight circuit 216. The circuit 216 produces a 1 MHZ signal which is transmitted through a line 218 to the inputs of a divide-by-two circuit 220, a divide-by-four circuit 222 and a divide-by-eight circuit 224. The circuit 220 produces a 500 KHZ signal which is transmitted through line 226 to a timing signal multiplexer 228. The divide-by-four circuit 222 produces a 250 KHZ signal which is transmitted through line 230 through the multiplexer 228. The divide-by-eight circuit 224 produces a 125 KHZ signal which is transmitted through line 232 to the multiplexer 228. The 50 MHZ reference signal at line 158 is further transmitted to the multiplexer 228. The timing signal multiplexer 228 produces a 250 KHZ square wave at a line 234, a 20 nanosecond wide gated pulse signal at a 250 KHZ rate at a line 236 and a 125 KHZ square wave at a line 238. The lines 234, 236 and 238 correspond to the line 168 in FIG. 4.

Figure 7:
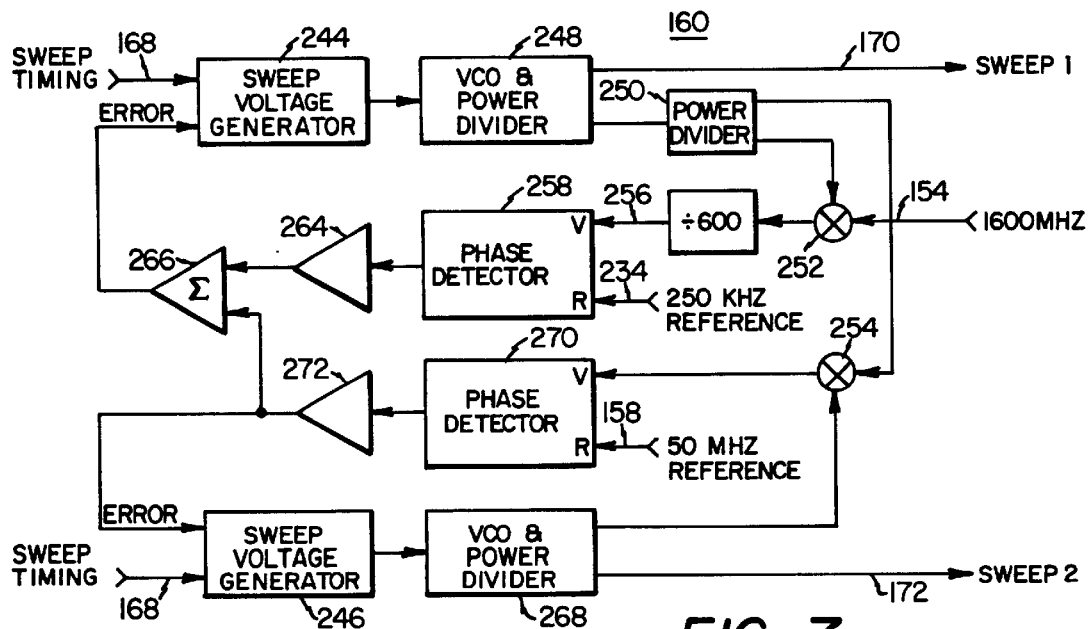
FIG. 7 is a detailed block diagram of a sweep oscillator circuit as used in the receiver in FIG. 1.

The dual sweep oscillator 160 shown in FIG. 4 is illustrated in detail in FIG. 7. The oscillators 162 and 164 are structurally similar to oscillator 160. The sweep timing signal at line 168 from the generator 166 is input to sweep voltage generators 244 and 246. These voltage generators produce a sawtooth waveform. The output of generator 244 is provided as the control signal to a voltage controlled oscillator and power divider circuit 248. A first output of circuit 248 is the sweep 1 signal at line 170. The second output of the oscillator 160 is input to a power divider 250 which provides outputs to a mixer 252 and a mixer 254. The 1600 MHZ reference signal at line 154 is input to the mixer 252. The output of mixer 252 is passed through a divide-by-600 circuit 256 with the output thereof input to the V terminal of a phase detector 258. The 250 KHZ reference signal at line 234 is input to the R terminal of the phase detector 258.

The output of the phase detector 258 is transmitted through an amplifier 264 to a first input of a summation circuit 266. The output of the circuit 266 comprises an error signal which is input to the sweep voltage generator 244.

The sweep voltage generator 246 produces a sweep voltage which is input to control a VCO and power divider circuit 268. A first output of circuit 268 is provided as the second input to the mixer 254. The second output of the circuit 268 is the sweep 2 signal at line 172.

The output of the mixer 254 is input to the V terminal of a phase detector 270. The 50 MHZ reference signal at line 158 is input to the R terminal of the phase detector 270. The output of the phase detector 270 is transmitted through an amplifier 272 to a second input of the summation circuit 266 and as an error signal to the sweep voltage generator 246. The amplifiers 264 and 272 serve as loop stabilizing amplifiers.

Figure 8:
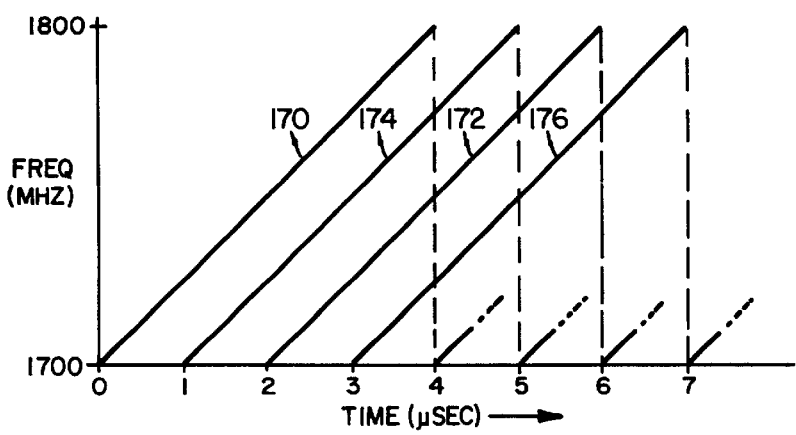
FIG. 8 is an illustration of the sweep waveforms produced by a plurality of the sweep oscillators shown in FIG. 7.

The sweep signals produced by the dual sweep oscillator 160 shown in FIG. 7 are illustrated in FIG. 8. The sweep waveforms are indicated by the corresponding lines 170, 172, 174 and 176. For the illustrated embodiment of the present invention the sweep waveforms have a linear sweep between 1700 MHZ and 1800 MHZ over a time frame of four microseconds. The four sweeps are initiated at one microsecond delay intervals.

Operation of the dual sweep oscillator 160 is now briefly described in reference to FIGS. 7 and 8. The timing signal from line 168 triggers the sweep voltage generator 244 to produce a sawtooth waveform that controls the frequency of the VCO and power divider circuit 248. The linearity and frequency rate of the sweep waveforms is controlled by a feedback loop which receives various reference signals. The sweep signal produced by circuit 248 is input to the mixer 252 together with the 1600 MHZ local oscillator signal received through line 154. For the present embodiment the output of circuit 248 is down converted by operation of the mixer 252 to produce a signal having a center frequency of 150 MHZ. This signal is input to the divide-by-600 circuit 256 and the result is provided to the phase detector 258. A phase comparison is made between the output signal of circuit 256 and the 250 KHZ reference signal received through line 234. An error signal is produced if the down converted sweep does not exactly make a 600 cycle phase change over a period of four microseconds. A similar comparison is made between the down converted output of circuit 268, as produced by mixer 254 and a 50 MHZ reference signal. The output of the phase detector 270 produces an error signal whenever the frequency difference between the two circuits 248 and 268 deviates from 50 MHZ. The error signals produced by the phase detectors are input to the sweep voltage generators to alter the sweep voltage sawtooth signals such that the sweep signals produced by the oscillators are coherent and linear. The two sweep signals produced at lines 170 and 172 are offset in time by two microseconds. The dual sweep oscillator 162, as shown in FIG. 5, is delayed by one microsecond from the dual sweep oscillator 160. Likewise, the dual sweep oscillator 164 is delayed by one microsecond from the dual sweep oscillator 162. The outputs of the dual sweep oscillators are provided to the frequency domain samplers, shown in FIG. 1, such that there is a one microsecond delay between the sweep signals provided respectively to the samplers 24, 26, 28 and 30. These signals correspond respectively to the sweep signals at lines 170, 174, 172 and 176 in FIG. 8.

Figure 9:
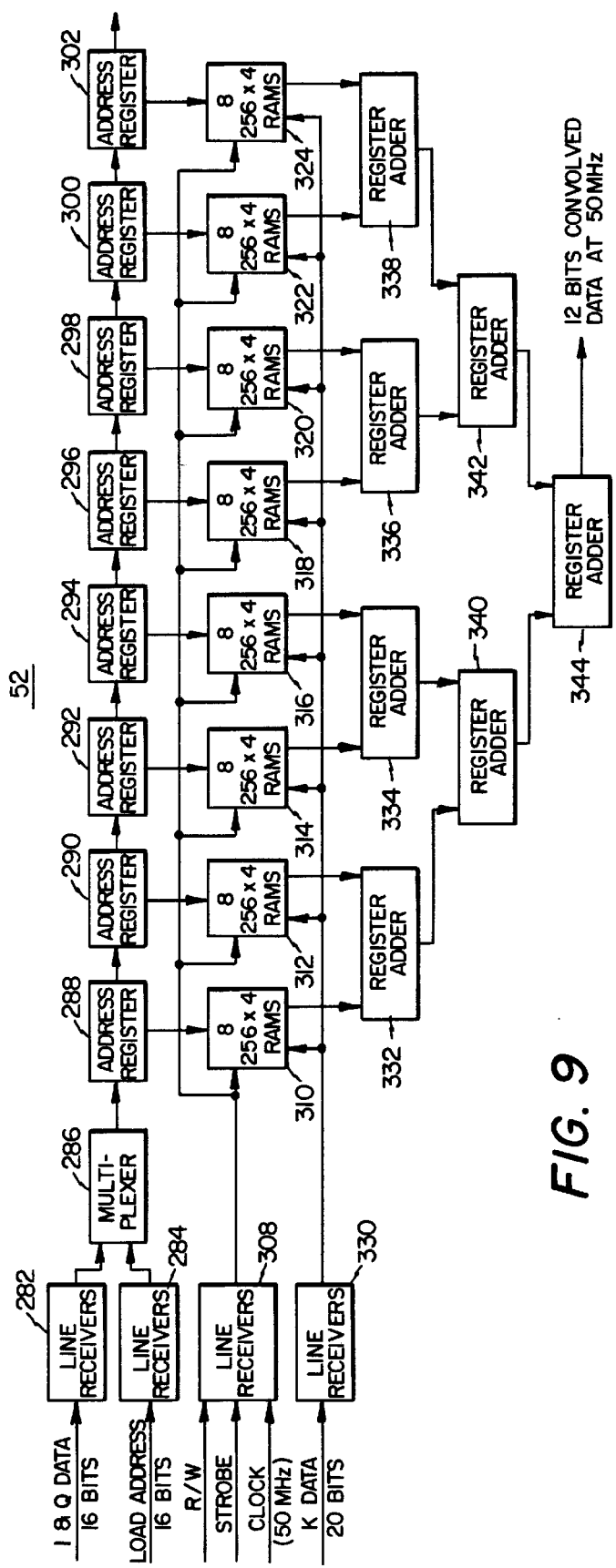
FIG. 9 is a block diagram of the digital impulse response equalizer shown in FIG. 2.

The digital impulse response equalizer 52 shown in FIG. 2 is illustrated in detail in FIG. 9.

The I and Q data samples which are derived from the converters 96 and 100 are input to line receivers 282. A 16 bit load address is input to line receivers 284. The outputs of the line receivers 282 and 284 are provided to a multiplexer 286. The output from the multiplexer 286 is sequentially shifted through address registers 288, 290, 292, 294, 296, 298, 300 and 302. A group of control signals including read/write, strobe, and a clock signal are input to line receivers 308. The signals from the line receivers 308 are input to each of a plurality of random access memories 310, 312, 314, 316, 318, 320, 322 and 324.

A correction coefficient (K) is input to line receivers 330. The correction coefficient is produced by the generator 118 shown in FIG. 2. From the line receivers 330 the correction coefficient is input to each of the random access memories 310 through 324.

The information which is read from the random access memories 310 and 312 is input to a register adder 332. The outputs of the random access memories 314 and 316 are input to a register adder 334. The outputs of the random access memories 318 and 320 are input to a register adder 336. The outputs of random access memories 322 and 324 are input to a register adder 338. Within each of the register adders 332 through 338 the inputs are summed and passed to an output line.

The outputs from the register adders 332 and 334 are input to a register adder 340. The outputs of the register adders 336 and 338 are input to a register adder 342. Last, the outputs of the adders 340 and 342 are input to a register adder 344 which produces 12 bit convolved data at 50 MHZ.

The digital impulse response equalizer 52 functions as a digital convolver which modifies the I and Q data by a correction function which is produced independently for each of the channels of the radio receiver 10. The convolving of the correction function with the I and Q data serves to equalize the impulse response of the channels of the radio receiver. The embodiment of the equalizer 52 shown in FIG. 9 provides for a convolution by an 8 term function. If more than 8 terms are desired, the circuitry can be extended by employing the I and Q outputs of address register 302 as data inputs to additional modules identical with equalizer 52 and summing all the outputs of convolved data from equivalent register adders 344. Operation of the circuit is described below.

The digital impulse response equalizer 52 and the correction coefficient generator 118 provide for correcting the channel impulse response to a standard form h(t) for all channels. This correction is accomplished by digital convolution of the outputs of the analog-to-digital converters 96 and 100, with a function determined by the correction coefficient generator 118. The required values for the coefficients are established in a calibration mode wherein switch 80 is positioned to accept the calibration signal at line 82 (FIG. 2). A microprocessor within generator 118 compares the amplitudes of the outputs of equalizer 52 with the predetermined desired response to the calibration signal. The resulting error function is used in an estimation process to adjust the values of the coefficients in a manner that minimizes the residual error. When the residuals are within acceptable bounds, the calibration process is declared complete and normal operation is resumed by repositioning switch 80 to accept the input signal and the pilot tone.

The structure of the embodiment presented in FIG. 9 is designed to support a data rate of 50 million I/Q sample pairs per second with minimum hardware. Loading of the memories 310–324, which comprise look-up tables, and generation of the convolution output term is described below.

The load address at line receivers 284 and the control signals at line receivers 308, are generated by the correction coefficient generator 118 to load the correction coefficient data into look-up-table (LUT) multipliers comprising the random access memories 310–324. Each of the memories comprises four sections having 256 words of 8 bits each. Two of the sections are loaded with the products of the real part of the correction coefficient and the address. Two sections are loaded with the products of the imaginary part of the correction coefficient and the address. The twenty bit K data word comprises 8 bits of real product, 8 bits of imaginary product and 4 bits of RAM selection control data. Loading of the data is accomplished by selecting the load address at receivers 284 with the multiplexer 286. The address is then sequenced through the range 1 to 255. Each address is maintained for 8 memory write cycles and shifted to successive address registers following each cycle. The K data values and the RAM selection control data are synchronized with the address generation to write the appropriate LUT real and imaginary values into the RAMS. This process is under control of the correction coefficient generator 118 and requires 255×8 or 2,040 memory write cycles to complete. Following completion of the load cycle, the multiplexer 286 is set to accept I & Q data from the line receivers 282.

The convolution process is accomplished by sequencing each I/O data pair through the address registers 288–302. Each of the eight I and Q data values in the address registers address one of the real coefficient product RAMS and one of the imaginary coefficient RAMS. The four resulting values for each of the eight coefficients are combined to form the complex products of the coefficients and the complex number formed by the I and Q components. The eight products are formed for each process cycle, one for each of eight sequential I/O sample pairs. These eight products are combined by the register adders 332–344 to form a 12 bit result at the output of register adder 344. This result is a term of the convolution of the 8 term impulse response equalization function and the I/Q outputs of the associated channel.

The outputs of the digital impulse response equalizers 52, 60, 62 and 64 are time samples of the Fourier transform of the input time signal convolved with a standard time impulse response function h(t).

Figure 10:
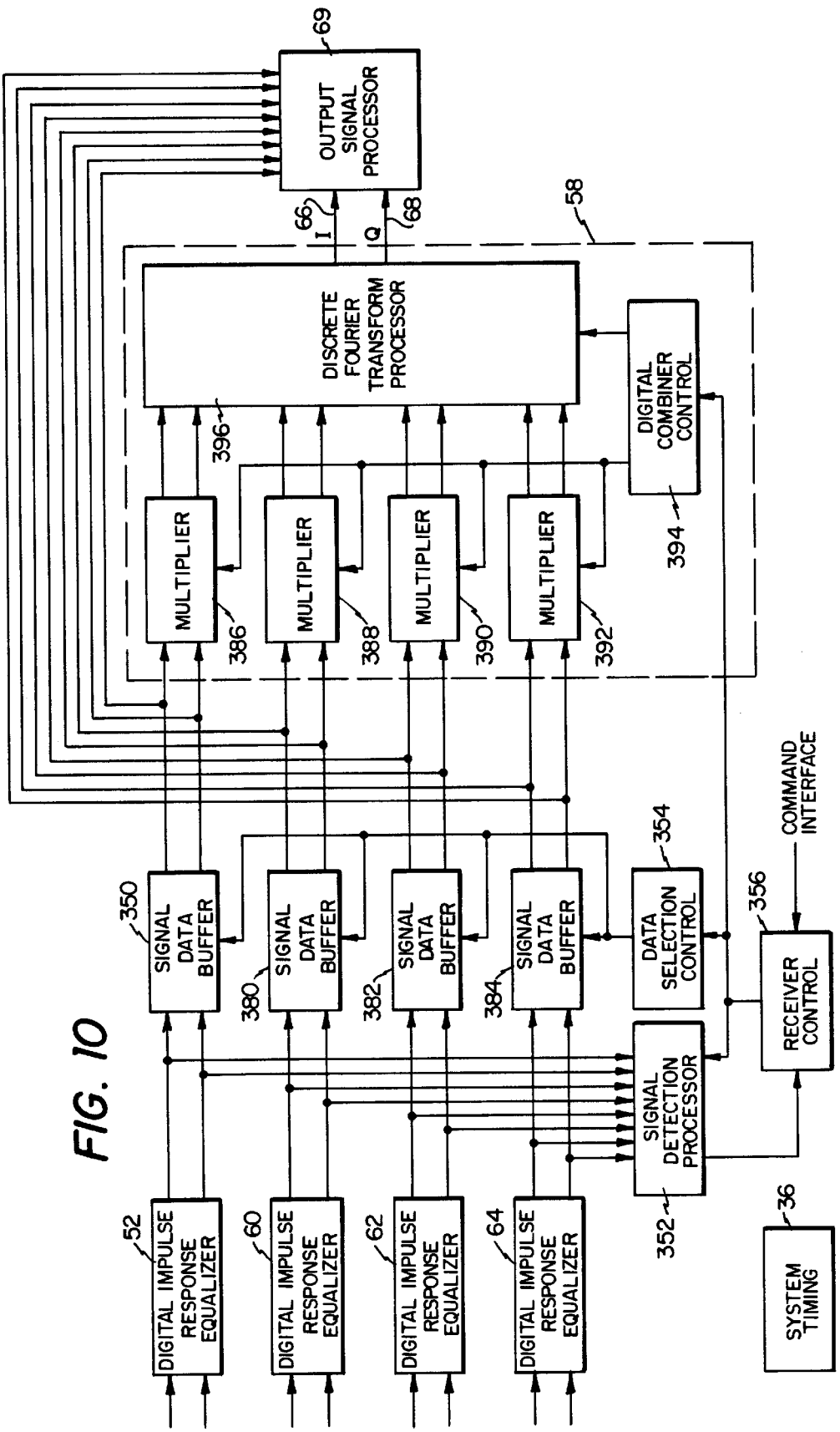
FIG. 10 is a block diagram illustrating in greater detail the digital combiner circuit shown in FIG. 1.

Temporary data storage, for the equalizer output samples, signal detection apparatus, and the digital combiner circuit 58 shown in FIG. 1 are described in detail in FIG. 10. Temporary data storage is provided for each channel by identical signal data buffers 350, 380, 382, and 384. The data buffer 350 is further described in FIG. 11.

The I and Q outputs of the equalizers 52, 60, 62 and 64 are also provided directly to the signal detection processor 352. The detection processor 352 performs the function of determining which of the frequency cells of the input signal contain noise only and which contain signal plus noise. Detection parameters are input to the signal detection processor 352 via the receiver control function 356 to allow a wide range of criteria to be implemented. Outputs of the detection processor 352 are used by the receiver control 356 and an operator to identify those frequency cells that contain data and to define subsequent processing. Sample selection is accomplished via the data selection control 354 for data transfer to either the output signal processor 69 or the digital combiner 58. Those data samples channeled to the digital combiner 58 contain data for which a time sampled, complex frequency domain representation is required. Frequency resolution refinement may or may not occur depending upon the state of the command interface.

The digital combiner circuit 58 performs a digital combination of the channel outputs to form a complex frequency domain representation of the input signal bandwidth or a portion thereof. The I and Q data from each of the frequency domain sampler channels 24, 26, 28 and 30 as they occur as outputs of the digital impulse response equalizers 52, 60, 62 and 64 are stored respectively in signal data buffers 350, 380, 382, and 384. Storage address within the buffer is associated with frequency or sample number relative to the start of the sweep of the individual channel. Time of occurrence of a specific sample number is staggered; e.g., sample number 100 from the four digital impulse equalizers occurs at one microsecond intervals with an output from equalizer 52 one microsecond after an output from equalizer 64, an output from equalizer 60 one microsecond after an output from equalizer 52, an output from equalizer 62 one microsecond after an output from equalizer 60 and an output from equalizer 64 one microsecond after an output from equalizer 62. The process repeats with the result that each frequency sample number is continuously sampled at one microsecond intervals.

A discrete Fourier transform processor 396 and four complex multipliers 386, 388, 390, and 392 are employed to convert multiple time samples of each sample number into multiple frequency samples with smaller frequency separation. The signal data buffers 350, 380, 382 and 384 respectively provide inputs to the multipliers 386, 388, 390 and 392. The outputs from the buffers 350, 380, 382 and 384 can also be provided directly to the output signal processor 69. The initial frequency separation of the samples is 500 kilohertz. The resolution of the I and Q samples at lines 66 and 68 out of the combiner 58 is 1 MHZ/N where N is the length of the DFT process accomplished by processor 396; e.g., a 16 term DFT will result in an output sample spacing of 62.5 KHZ and a 64 term DFT will result in a spacing of 15.625 KHZ. The multipliers 386, 388, 390 and 392 perform a sample weighting by a time window function to control frequency sidelobe structure of the output frequency spectrum representation of the input signal. In addition, the multipliers perform a time alignment of the spectrum by removing the inherent time skew of the frequency domain sampling process.

A digital combiner control 394 performs the functions of sequencing the I and Q data out of the signal data buffers 350, 380, 382 and 384, selecting the appropriate multiplier constants for the time alignment and windowing functions required by the multipliers 386, 388, 390, and 392, and for set up and timing control of the DFT processor 396.

Figure 11:
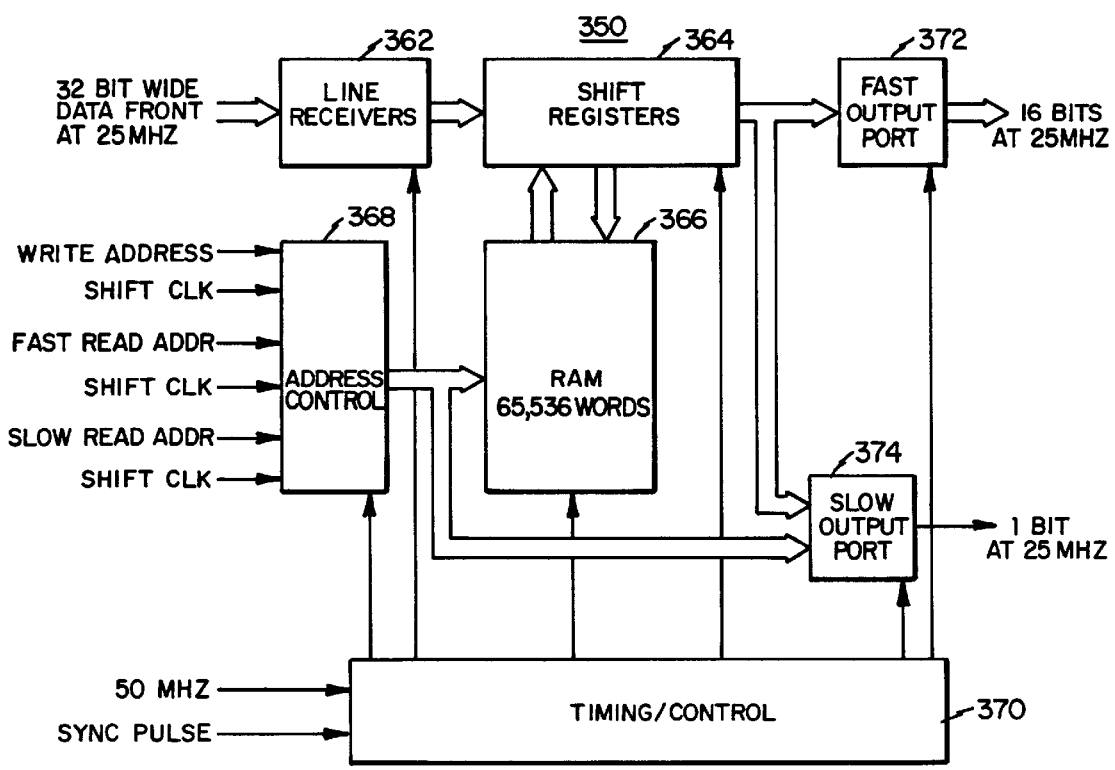
FIG. 11 is a block diagram for a data sample buffer utilized to store the digital output for the radio receiver illustrated in FIG. 1.

The structure of the signal data buffer 350 shown in FIG. 10 is illustrated in FIG. 11. The I and Q data from the frequency domain samplers 24–30 are input as a 32 bit wide data front at 25 MHZ to line receivers 362. The I and Q data are then input to shift registers 364. From the shift registers 364 the I and Q data can be input to a random access memory 366. A plurality of memory control signals are input to an address control 368 which serves to control the writing and reading of data in the random access memory 366. A 50 MHZ clock signal and sync pulse are input to a timing/control circuit 370 which provides control signals to the line receivers 362, shift registers 364, address control 368, random access memory 366, a fast output port 372 and a slow output port 374. The output of port 372 is a 16 bit signal at 25 MHZ and the output of port 374 is a one bit signal at 25 MHZ.

In summary, the present invention comprises a wide band radio receiver which can be configured for any desired intercept bandwidth, up to about 1 GHZ with presently available technology by using a number of frequency domain sampler channels. Each sampler channel sweeps the entire intercept bandwidth. Each channel is sampled at a rate such that the intercept signal bandwidth is completely covered for assured reception of any signal in the intercept bandwidth.

Although one embodiment of the invention has been illustrated in the accompanying Drawings and described in the foregoing Detailed Description, it will be understood that the invention is not limited to the embodiment disclosed, but is capable of numerous rearrangements, modifications and substitutions without departing from the scope of the invention.

I claim:

1. A wideband radio receiver, comprising:
   means for distributing an input signal to a plurality of output terminals;
   a timing circuit;
   a plurality of frequency domain samplers connected respectively to said output terminals for receiving said input signal, each of said frequency domain samplers including,
   means for generating a repetitive frequency sweep signal timed in response to said timing circuit;
   a first mixer for mixing said input signal and said sweep signal to produce a first mixer output signal;
   a frequency weighting filter connected to receive said first mixer output signal and produce a filtered signal;
   means for generating a first fixed frequency local oscillator signal;
   a second mixer for mixing said filtered signal and said first fixed frequency local oscillator signal to produce a second mixer output signal;
   a dispersive delay line connected to receive said second mixer output signal and produce a compressed signal;
   means for generating a second fixed frequency local oscillator signal;
   means for phase shifting said second fixed frequency signal to produce a quadrature phase second fixed frequency local oscillator signal;
   a third mixer for mixing said compressed signal with said second fixed frequency local oscillator signal to produce an inphase (I) baseband signal;
   a fourth mixer for mixing said compressed signal and said quadrature phase second fixed frequency local oscillator signal to produce a quadrature (Q) baseband signal;
   means for digitizing said I and said Q baseband signals to produce I and Q digital signal samples;
   means for convolving said I and said Q digital signal samples with a correction coefficient to produce digital I and Q output signals, said convolving for equalizing the response between said frequency domain samplers;
   means for storing said digital I and Q output signals for a selected time period;
   means for monitoring said digital I and Q outputs from said frequency domain samplers; and
   means for reading selected ones of said stored digital I and Q output signals to produce a series of digital outputs comprising an output signal from said wideband radio receiver.

2. A method for processing a wideband input signal to produce an output signal, comprising the steps of:
   generating timing signals;
   providing said input signal to a plurality of frequency domain samplers each of which carries out the steps of:
      generating a sweep frequency local oscillator signal in response to at least one of said timing signals;
      mixing said sweep frequency signal with said input signal to produce a first mixed signal;
      passing said first mixed signal through a frequency weighting filter to produce a filtered signal;
      generating a first fixed frequency local oscillator signal;
      mixing said first fixed frequency local oscillator signal with said filtered signal to produce a second mixed signal;
      passing said second mixed signal through a dispersive delay line to produce a compressed signal;
      generating a second fixed frequency local oscillator signal;
      phase shifting said second fixed frequency local oscillator signal to produce a quadrature phase second fixed frequency local oscillator signal;
      mixing said compressed signal with said second fixed frequency local oscillator signal to produce an in-phase (I) baseband signal;
      mixing said compressed signal with said quadrature phase second fixed frequency local oscillator signal to produce a quadrature phase (Q) baseband signal;
      digitizing said I and said Q baseband signals to produce I and Q digital signal samples;
      convolving said I and Q digital signal samples with a correction function to produce I and Q digital output signal samples, said convolving for providing response equalization between said frequency domain samplers;
      storing said I and Q digital output signal samples from each of said frequency domain samplers in a temporary storage;
      monitoring said I and Q digital output signals from said frequency domain samplers; and
      reading selected ones of said stored I and Q digital output signal samples from said temporary storage to produce a digital output comprising said output signal.

3. A method for processing a wideband input signal to produce an output signal, comprising the steps of:
providing said input signal to a plurality of frequency domain samplers each of which carry out the steps of:
generating a sweep frequency local oscillator signal;
mixing said sweep frequency signal with said input signal to produce a first mixed signal;
passing said first mixed signal through a frequency weighting filter to produce a filtered signal;
passing said filtered signal through a dispersive delay line to produce a compressed signal;
digitizing said compressed signal to produce signal samples having I (in-phase) and Q (quadrature phase) components;
storing the signal samples from each of said frequency domain samplers;
monitoring the signal samples produced by said frequency domain samplers; and
reading selected ones of said stored signal samples to produce a series of digital signal output samples which comprise said output signal.

4. A method as recited in claim 3 including the steps of equalizing the I (in-phase) and Q (quadrature phase) components of the signal samples produced by each of said frequency domain samplers.

5. A method is recited in claim 3 wherein the step of digitizing said compressed signal to produce signal samples having I (in-phase) and Q (quadrature phase) components for all of said frequency domain samples is carried out at a rate at least twice the bandwidth of said wideband input signal.

* * * * *

UNITED STATES PATENT AND TRADEMARK OFFICE
CERTIFICATE OF CORRECTION

PATENT NO. : 6,256,485 B1
DATED : July 3, 2001
INVENTOR(S) : William L. Heard

It is certified that error appears in the above-identified patent and that said Letters Patent is hereby corrected as shown below:

Column 3,
Line 40, after "labeled", delete "$DI_O$", and insert -- $DI_O$ --.

Column 9,
Line 52, after "accept", delete "I & Q", and insert -- I and Q --.
Line 55, after "each", delete "I/O" and insert -- I/Q --.
Line 63, after "sequential", delete "I/O" , and insert -- I/Q --.

Column 11,
Line 26, after "a" delete "wide band", and insert -- wideband --.

Column 12, claim 1,
Line 6, after "an", delete "inphase", and insert -- in-phase --.

Column 14, claim 5,
Line 10, after "method", delete "is", and insert -- as --.

Signed and Sealed this

Twelfth Day of March, 2002

Attest:

Attesting Officer

JAMES E. ROGAN
Director of the United States Patent and Trademark Office